United States Patent [19]

Tóth et al.

[11] 4,020,716
[45] May 3, 1977

[54] PLANETARY TRANSMISSION WHEEL DRIVE MECHANISM

[75] Inventors: István Tóth; Kálmán Prépost, both of Gyor, Hungary

[73] Assignee: Magyar Vagon- es Gepgyar, Gyor, Hungary

[22] Filed: Jan. 15, 1976

[21] Appl. No.: 649,354

[30] Foreign Application Priority Data

Feb. 14, 1975 Hungary .................... MA 2654

[52] U.S. Cl. .................... 74/768; 74/801; 74/391; 180/43 B
[51] Int. Cl.[2] .................... F16H 57/10; F16H 1/28; F16H 35/00; B60K 17/04
[58] Field of Search .......... 74/768, 769, 753, 785, 74/801, 391; 180/43 B

[56] References Cited

UNITED STATES PATENTS

| | | | |
|---|---|---|---|
| 1,768,225 | 6/1930 | Whitney | 180/43 B |
| 2,529,330 | 11/1950 | Double | 74/801 |
| 3,115,204 | 12/1963 | Dence | 74/785 X |
| 3,365,986 | 1/1968 | Mazziotti | 74/801 |
| 3,443,655 | 5/1969 | Beck et al. | 180/43 B X |
| 3,502,166 | 3/1970 | Christenson et al. | 74/801 X |
| 3,756,095 | 9/1973 | McCay, Jr. et al. | 74/801 |

FOREIGN PATENTS OR APPLICATIONS

| | | | |
|---|---|---|---|
| 1,264,473 | 10/1962 | France | 180/43 B |

Primary Examiner—Samuel Scott
Assistant Examiner—Lance W. Chandler
Attorney, Agent, or Firm—Young & Thompson

[57] ABSTRACT

In a planetary transmission wheel drive mechanism, particularly for applying driving torque to the driving wheels of heavy duty ground engaging vehicles such as trucks, tractors and the like a pair of planetary gear sets are employed in series connection in such a manner that one of the planetary gear sets has its sun gear on a drive shaft and its planetary carrier rotatably mounted in a stationary hub. Planetary pinion gears supported by the planetary carrier mesh with a gear ring which is fixed to the aforesaid hub. The other planetary gear set consists of a sun gear which is supported by an extension of the planetary carrier of the first mentioned planetary gear set. The sun gear of the second planetary gear set meshes with planetary pinion gears which, in turn, engage with a gear ring.

The invention consists in that the extension carrying the sun gear of the second mentioned planetary gear set is detachably connected to the planetary carrier of the first mentioned gear set while the gear rings of both planetary gear sets form a constructional unit. Thereby, the planetary transmission wheel drive mechanism is convertible from a double stage planetary transmission into a single stage device.

2 Claims, 2 Drawing Figures

PLANETARY TRANSMISSION WHEEL DRIVE MECHANISM

BACKGROUND OF THE INVENTION

This invention relates to a planetary transmission wheel drive mechanism, particularly for applying driving torque to the driving wheels of heavy duty ground engaging vehicles such as trucks, tractors and the like.

Planetary transmission wheel drive mechanisms or axle drives with built in planetary transmissions are already known for the advantage of an increased torque appearing at the end of the force flux so that axle drives of such type are particularly suitable for being comprised in the wheel hubs of trucks, busses and the like since they permit to employ relatively light constructions.

Such axle drives are of substantial importance in case of tractors and similar heavy duty vehicles which require exceedingly high transmissions or step-up gearings in their wheel hubs. As is known, to meet such requirements multistage planetary transmission gears are employed such as described in British patent specification No. 1,222,729 or U.S. Pat. No. 2,529,330. However, the known axle drives of the aforesaid type are relatively expensive because they have been built for special purposes and had to be specially developed for each vehicle type.

SUMMARY OF THE INVENTION

The main object of the present invention is to obviate such inconveniences and to provide an axle drive the planetary transmission gears of which may form units of an assembly system and optionally employed to provide single step or multi stage planetary transmission gears.

The invention aims at the provision of a first planetary gear set of a double stage planetary transmission gear for axle drives which, by means of dispensing with or replacing some component parts, will permit to transform a double stage type planetary transmission gear set in a single stage type of such drives and vice versa.

The basic idea of the invention consists in employing an axle drive having a first planetary gear set and a second planetary gear set with which the planetary carrier of the first planetary gear set is provided with an interchangeable extension having a sun gear of the second planetary gear set un-rotatably fixed to it. The invention proper consists in that the gear ring of the first planetary gear set is detachably connected to a hub of the axle drive and forms a constructional unit with the gear ring of the second planetary gear set. It will be shown that, on the one hand, by such separation of the first planetary gear set from the hub of the axle drive and, on the other hand, by uniting the gear rings of both planetary gear sets an advantageous solution of the technical problem in the background of the invention will be obtained.

Further details of the invention will be described by taking reference to the accompanying drawings, which show, by way of example, a pair of preferable embodiments of the axle drive according to the invention and in which:

DETAILED DESCRIPTION OF THE PREFERRED EMBODIMENT

Figure 1:
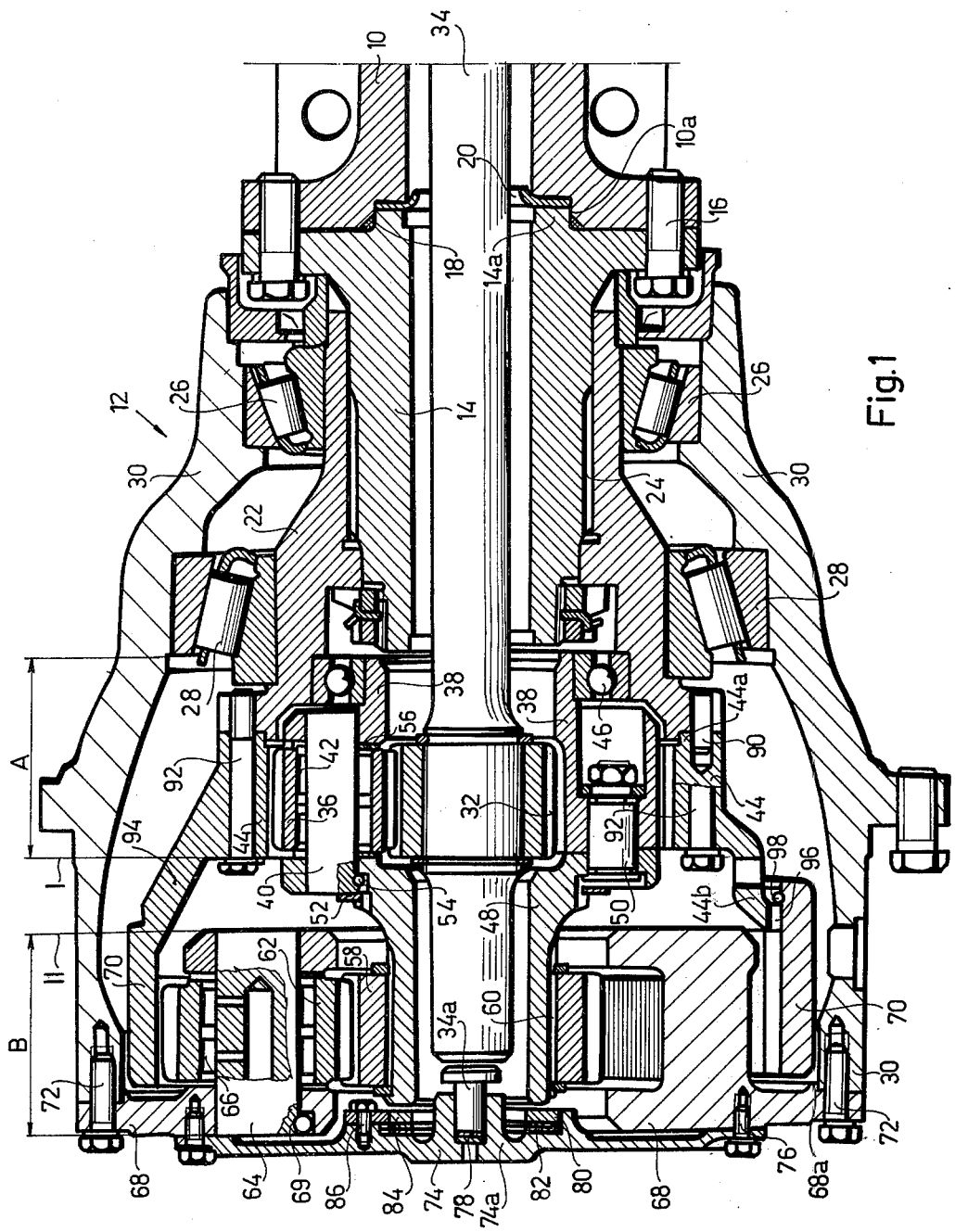
FIG. 1 shows a longitudinal sectional view of a first exemplified embodiment of a double-stage axle drive according to the invention.

In the drawing, reference character 10 designates an axle housing having axle drives 12 according to the invention connected to it one of which is shown in the drawing.

The represented axle drive 12 comprises, in the usual manner, a hollow spindle 14 which is fixed on the axle housing 10 by means of screws 16. Concentric positions of axle housing 10 and hollow spindle 14 are ensured by a fitting flange 14a of the hollow spindle 14. The fitting flange 14a abuts against an annular recess 10a of the axle housing 10 with the insertion of a rubber sealing ring 18 and a mounting plate 20 in a manner known per se.

The hollow spindle 14 supports a hub 22 to which it is un-rotatably splined as at 24. The hub 22 carries a pair of conical roller bearings 26 and 28 by which a wheel hub 30 is rotatably supported.

In the wheel hub 30 there are a pair of planetary gear sets which are designated as a first or inner planetary gear set A and a second planetary gear set B, respectively.

The first planetary gear set A consists of a first sun gear 32 which is un-rotatably splined to a driving shaft 34 and meshes with planetary pinion gears 36. The latter are rotatably supported by bolts 40 in needle bearings 42 on a first planetary carrier 38, and mesh with a first gear ring 44.

The planetary carrier 38 is rotatably supported by the un-rotatably disposed hub 22 by means of ball bearings 46 and is provided with an interchangeable or replaceable extension 48 which is detachably connected to the planetary carrier 38 by means of screws 50.

The axial position of the bolts 40 are ensured by snap rings or retainers 52 and balls 54 which engage peripheral and axial grooves in the extension 48 and in the bolts 40, respectively, as is known in the art. Support disks 56 between planetary pinion gears 36 and planetary carrier 38 as well as extension 48 serve for preventing undue wear.

The extension 48 carries a second sun gear of the second planetary gear set B with which it is un-rotatably connected by means of a splining 60. The sun gear 58 meshes with a set of second planetary pinion gears 62 of the second planetary gear set B, the planetary pinion gear 62 being rotatably supported by a second planetary carrier 68 in needle bearings 66, and mesh with a second gear ring 70. Axial positions of the bolts 64 are determined by balls 69 as was the case with the bolts 40 of the first planetary gear set A. The planetary carrier 68 of the second planetary gear set B is fixedly connected with the wheel hub 30 by means of screws 72. Concentricity or alignment of the planetary carrier 68 and the wheel hub 30 is ensured in the already described manner by means of a fitting flange 68a of the planetary carrier 68 which abuts against an inner cylindrical surface of the wheel hub 30.

The outer extremity of the axle drive 12 is closed by a closure lid 74 which is fixed to the planetary carrier 68 of the second planetary gear set B by means of screw bolts 76. In a hub 74a of the closure lid 74 there is a bore which receives a trunnion or axle pin 34a of the drive shaft 34 with the insertion of intermediate plates 78 so as to determine the mutual axial positions of the lid 74 and the drive shaft 34. Reference numeral 80 designates a slide ring between extension 48 and closure lid 74, intermediate plates 82 being provided between closure lid 74 and slide ring 80 so as to adjust the axial position of the latter. A wedge 84 prevents the rotation of slide ring 80. Position of the wedge 84 is, in a manner known per se, fixed by a screw 86.

The axle drive 12 according to the invention is distinguished over the prior art by a pair of main features.

First, the gear ring 44 of the first planetary gear set A is detachably connected with the hub 22 of the axle drive 12. For this purpose, the gear ring 44 is provided with an annular recess 44a which receives a fitting flange of the hub 22. Mutual positions of gear ring 44 and hub 22 in the peripheral direction are ensured by fitted bolts 90, while their mutual axial positions are fixed by screws 92.

Secondly, the gear ring 44 of the first planetary gear set A forms a constructional unit with the gear ring 70 of the second planetary gear set B.

The upper part of FIG. 1 shows an exemplified embodiment where the constructional unit is formed by the gear ring 44 of the first planetary gear set A being integral with the gear ring 70 of the second planetary gear set B, both gear rings 44 and 70 being connected by a conical flange 94 between planes I and II.

With the represented exemplified embodiment according to the bottom part of FIG. 1, the gear ring 70 of the second planetary gear set B is detachably connected to the gear ring 44 of the first planetary gear set A. The gear ring 44 is provided with a wreath like extension 44b which engages the gear ring 70 through a splining 96. Their mutual axial positions are fixed by a snap ring or retainer 98 while an axial clearance may be provided for so as to further an even load distribution on the planetary pinion gears 62. Furthermore, the wreath like extension 44b abuts against the side surface of the toothing of the gear ring 70 facing the first planetary gear set A whereby the axial position of the latter is additionally fixed.

In operation, rotation of the drive shaft 34 means a simultaneous rotation of the sun gear 32 of the first planetary gear set A whereby the planetary pinion gears 36 of the latter roll down on the gear ring 44 which, in turn, is fixed through the hub 22 and the hollow spindle 14 to the axle housing 10 and takes up reaction forces of a torque arising in the planetary carrier 38.

The planetary carrier 38 is carried along by the planetary pinion gears 36 and set in rotation so that also the extension 48 fixedly connected to the planetary carrier 38 will rotate. The rotating extension 48 causes the sun gear 58 of the second planetary gear set B to rotate whereby the planetary pinion gears 62 roll down on the gear ring 70 and set their planetary carrier 68 in rotation.

The rotating planetary carrier 68 of the second planetary gear set B transmits the torque onto the wheel hub 30 which is rotatably supported by the conical roller bearings 26 and 28.

Figure 2:
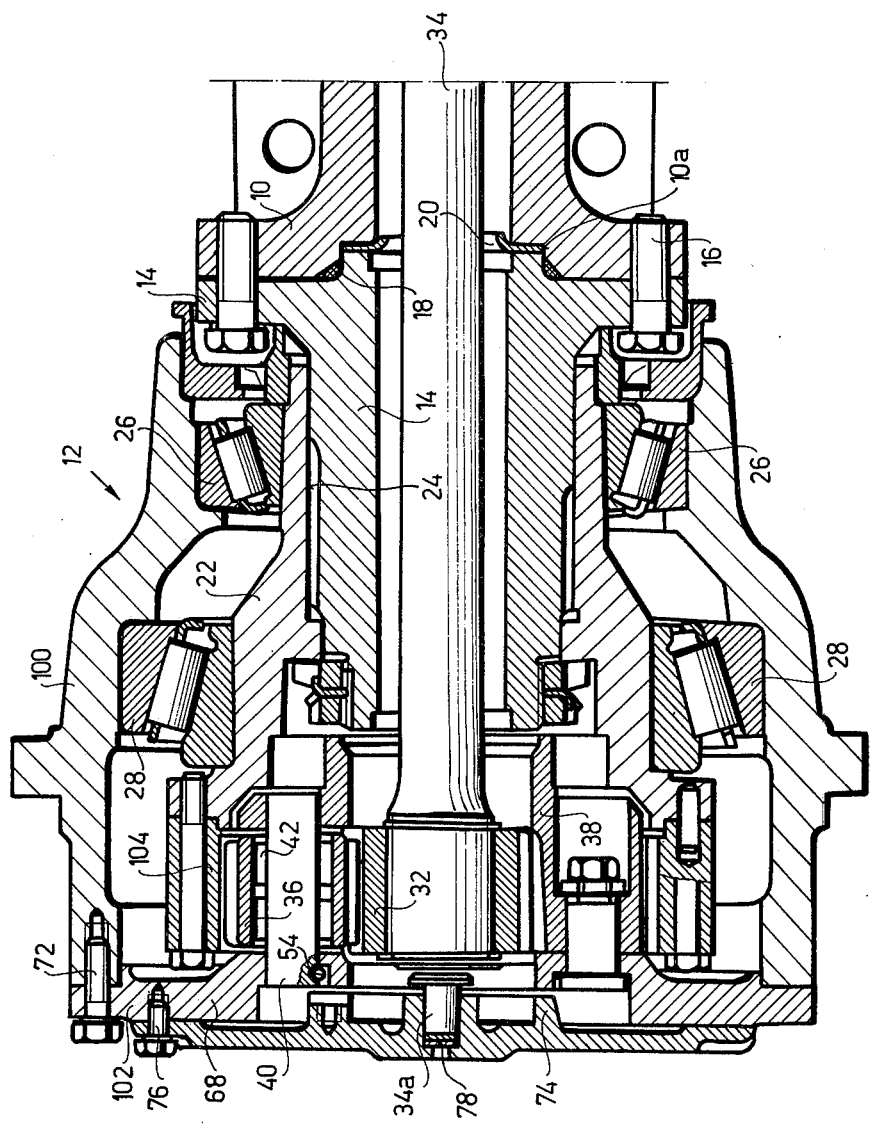
FIG. 2 illustrates the axle drive shown in FIG. 1 when transformed in a single-stage device.

In case an axle drive 12 according to FIG. 2 having a wheel hub 100 has to be built which is arranged for receiving a single planetary gear set, the extension 48 is dispensed with and, instead, a connection disk 102 is employed which is un-rotatably connected with the wheel hub 100 through the planetary carrier 38.

In order to obviate that the drive shaft and the gear ring protrude from the wheel hub 100, preferably a relatively shorter drive shaft 34 will be selected and the gear rings of the previous embodiment are replaced by a conventional gear ring 104.

Since by the wheel hub 100 also the position of the planetary carrier 38 is fixed with the aid of the connection disk 102 and the closure lid 74, the ball bearing 46 employed in case of the exemplified embodiment shown in FIG. 1 is here dispensed with.

What we claim is:

1. In a planetary transmission wheel drive mechanism, particularly for applying driving torque to the driving wheels of heavy duty ground engaging vehicles such as trucks, tractors and the like, a first planetary gear set having a non-rotatable axle housing, a hollow spindle fixed to said non-rotatable axle housing, a hub splined to said hollow spindle, a wheel drum rotatably supported by said hub, a drive shaft rotatable in said hollow spindle, a first sun gear on said drive shaft, a first planetary carrier rotatably mounted in said hub, a first set of planetary pinion gears supported by said first planetary carrier, a first gear ring meshing with said first set of planetary pinion gears, and a second planetary gear set having an exchangeable extension removably fixed to said first planetary carrier, a second sun gear splined to said exchangeable extension, a second planetary carrier fixed to said wheel drum, a second set of planetary pinion gears supported by said second planetary carrier and meshing with said second sun gear, a second gear ring meshing with said second set of planetary pinion gears, said first gear ring being detachably connected to said hub and forming a constructional unit with said second gear ring.

2. In a planetary transmission wheel drive mechanism as claimed in claim 1 the improvement of said second gear ring of said second planetary gear set being detachably connected to said first gear ring of said first planetary gear set.

* * * * *